US012769240B2

(12) United States Patent
Shimizu et al.

(10) Patent No.: US 12,769,240 B2
(45) Date of Patent: Oct. 20, 2026

(54) IMAGE FORMING APPARATUS INCLUDING A SENSOR, WHICH DETECTS A SHEET LEADING EDGE, DISPOSED ON A DOOR

(71) Applicant: CANON KABUSHIKI KAISHA, Tokyo (JP)

(72) Inventors: Iku Shimizu, Chiba (JP); Yuta Suzuki, Ibaraki (JP); Yukinojo Toda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/736,890

(22) Filed: Jun. 7, 2024

(65) Prior Publication Data

US 2024/0427278 A1 Dec. 26, 2024

(30) Foreign Application Priority Data

Jun. 22, 2023 (JP) ................................ 2023-102541

(51) Int. Cl.
*G03G 15/00* (2006.01)
*G03G 21/16* (2006.01)

(52) U.S. Cl.
CPC ..... *G03G 15/6561* (2013.01); *G03G 21/1633* (2013.01); *G03G 2215/00544* (2013.01);
(Continued)

(58) Field of Classification Search
CPC .......... G03G 2215/00544; G03G 2215/00679; G03G 21/1633
See application file for complete search history.

(56) References Cited

U.S. PATENT DOCUMENTS 6,144,811 A * 11/2000 Ohori ................. G03G 15/5041 399/9
7,917,062 B2 * 3/2011 Shin ..................... G03G 15/657 399/124
(Continued)

FOREIGN PATENT DOCUMENTS

CN 107065472 B * 1/2020 ........... G03G 15/657
CN 112445096 A * 3/2021 ............... B65H 5/38
(Continued)

OTHER PUBLICATIONS

English translation of CN-107065472-B (Year: 2020).*
English translation of CN-112445096-A (Year: 2021).*
English translation of EP-0357041-A2 (Year: 1990).*

*Primary Examiner* — Arlene Heredia Ocasio
(74) *Attorney, Agent, or Firm* — ROSSI, KIMMS & McDOWELL LLP

(57) ABSTRACT

An image forming apparatus includes a casing, an opening and closing unit, an image forming unit, a registration roller pair, a detection unit, and a guide unit. The guide unit forms a sheet conveyance path that guides a sheet from the registration roller pair to an image forming position. The guide unit includes a guide surface arranged in a manner inclined toward a side of the registration roller pair from a direction parallel to a straight line connecting centers of the registration roller pair when viewed in an axial direction of the registration roller pair. The guide unit and the registration roller pair are arranged such that a nip line of the registration roller pair intersects the guide surface of the guide unit at a position upstream of a detection position of the detection unit in a sheet conveyance direction when viewed in the axial direction.

13 Claims, 9 Drawing Sheets

(52) U.S. Cl.
CPC ............. *G03G 2215/00616* (2013.01); *G03G 2215/00679* (2013.01)

(56) References Cited

U.S. PATENT DOCUMENTS

| | | | | |
|---|---|---|---|---|
| 10,474,086 | B2 | 11/2019 | Tomita et al. | |
| 2008/0205953 | A1 * | 8/2008 | Takemoto | G03G 21/16 399/397 |
| 2008/0232847 | A1 * | 9/2008 | Kusukawa | G03G 21/1671 399/114 |
| 2017/0115615 | A1 * | 4/2017 | Yamakawa | B65H 5/36 |
| 2018/0017913 | A1 * | 1/2018 | Sato | B41J 3/60 |

FOREIGN PATENT DOCUMENTS

| | | | | |
|---|---|---|---|---|
| EP | 0357041 | A2 * | 3/1990 | G03G 21/1652 |
| EP | 1246027 | A2 * | 10/2002 | G03G 15/5041 |
| JP | 2007320760 | A | 12/2007 | |
| JP | 2012230240 | A | 11/2012 | |

* cited by examiner

IMAGE FORMING APPARATUS INCLUDING A SENSOR, WHICH DETECTS A SHEET LEADING EDGE, DISPOSED ON A DOOR

BACKGROUND OF THE INVENTION

Field of the Invention

The present invention relates to image forming apparatuses for forming images on sheets.

Description of the Related Art

Image forming apparatuses such as facsimile machines, copying machines, and MFPs widely adopt a configuration in which a registration roller pair against which sheets are abutted and stopped is disposed, wherein the drive of the registration roller pair is restarted at a timing to match the formation of image. In such image forming apparatuses, it is possible to convey a sheet so as to match a leading edge of the sheet with the position of the image to be formed on the sheet. For example, a technique is provided to control relative positioning of the image and the sheet with high accuracy by adopting a control of storing an image forming timing and changing the image forming timing to correct a printing position of an image, and a sheet position sensor disposed downstream in a conveyance direction of the registration roller pair. The sheet position sensor is arranged downstream of the registration roller pair and between the registration roller pair and an image forming position of forming an image on a sheet, such as a transfer portion of an electrophotographic system or a recording portion of an inkjet system. Such a control is also referred to as a leading edge registration control in the present description.

Specifically, an image forming apparatus has been developed that uses a sheet position sensor for detecting a position of a sheet stopped at the registration roller pair, and determining a restarting speed and a maintaining time of the registration roller pair using a deviation of position with respect to an image position, based on which control is performed to convey sheets (Japanese Patent Application Laid-Open Publication No. 2007-320760). Further, an image forming apparatus has been developed that uses a control unit for changing an image forming timing to correct a printing position of image and a sheet position sensor disposed downstream of the registration roller pair for changing the image position to match a delay of sheet position with respect to a reference time (refer to Japanese Patent Application Laid-Open Publication No. 2012-230240).

Next-generation office devices are required to provide higher registration accuracies compared to conventional devices to realize higher image quality, and for example, the level of accuracy of leading edge registration realized for each operation in duplex printing is required to be 1 mm or smaller. However, in image forming apparatuses disclosed in Japanese Patent Application Laid-Open Publication Nos. 2007-320760 and 2012-230240, for example, when a sheet is conveyed upward or downward in a vertical direction, which is hereinafter also referred to as vertical path conveyance, the leading edge of the sheet may be fluttered in a sheet surface direction within a space formed between guide members. Therefore, distance between the sheet position sensor and the leading edge of the sheet may be dispersed and becomes unstable, by which a detection accuracy of the sheet position sensor is deteriorated, and there is a risk that desired accuracy of leading edge registration may not be achieved.

The present invention provides an image forming apparatus capable of suppressing dispersion of distance between a sheet position sensor, which is disposed between a registration roller pair and an image forming position, and a leading edge of a sheet conveyed from the registration roller.

SUMMARY OF THE INVENTION

According to a first aspect of the present invention, an image forming apparatus includes a casing, an opening and closing unit configured to open and close by pivoting with respect to the casing, an image forming unit accommodated in the casing and configured to form an image on a sheet, the image being formed on the sheet at an image forming position, a registration roller pair positioned upstream of the image forming position in a sheet conveyance direction along a vertical direction, including a first roller and a second roller configured to come into contact with each other to form a nip portion, and configured to nip the sheet at the nip portion to convey the sheet to the image forming position, a detection unit disposed on the opening and closing unit to be positioned between the registration roller pair and the image forming position in the sheet conveyance direction, and configured to detect a leading edge of the sheet conveyed from the registration roller pair toward the image forming position, and a guide unit configured to form a sheet conveyance path that is configured to guide the sheet from the registration roller pair to the image forming position, the guide unit including a guide surface arranged in a manner inclined toward a side of the registration roller pair from a direction parallel to a straight line connecting centers of the first roller and the second roller when viewed in an axial direction of the first roller. The guide unit and the registration roller pair are arranged such that a nip line of the registration roller pair intersects the guide surface of the guide unit at a position upstream of a detection position of the detection unit in the sheet conveyance direction when viewed in the axial direction.

Further features of the present invention will become apparent from the following description of exemplary embodiments with reference to the attached drawings.

DESCRIPTION OF THE EMBODIMENTS

Now, a present embodiment will be described with reference to the drawings. At first, a general configuration of an image forming apparatus 1 according to the present embodiment will be described with reference to FIG. 1. Sizes, materials, and relative positions of components of the image forming apparatus 1 illustrated in the description are not intended to limit the scope of the present technique, unless denoted otherwise. Further according to the present embodiment, a full-color copying machine having a plurality of photosensitive drums is adopted as the image forming apparatus 1. However, the present technique is not limited thereto, and it may be applied to a monochromatic or mono-color copying machine or printer equipped with one photosensitive drum.

Image Forming Apparatus

Figure 1:
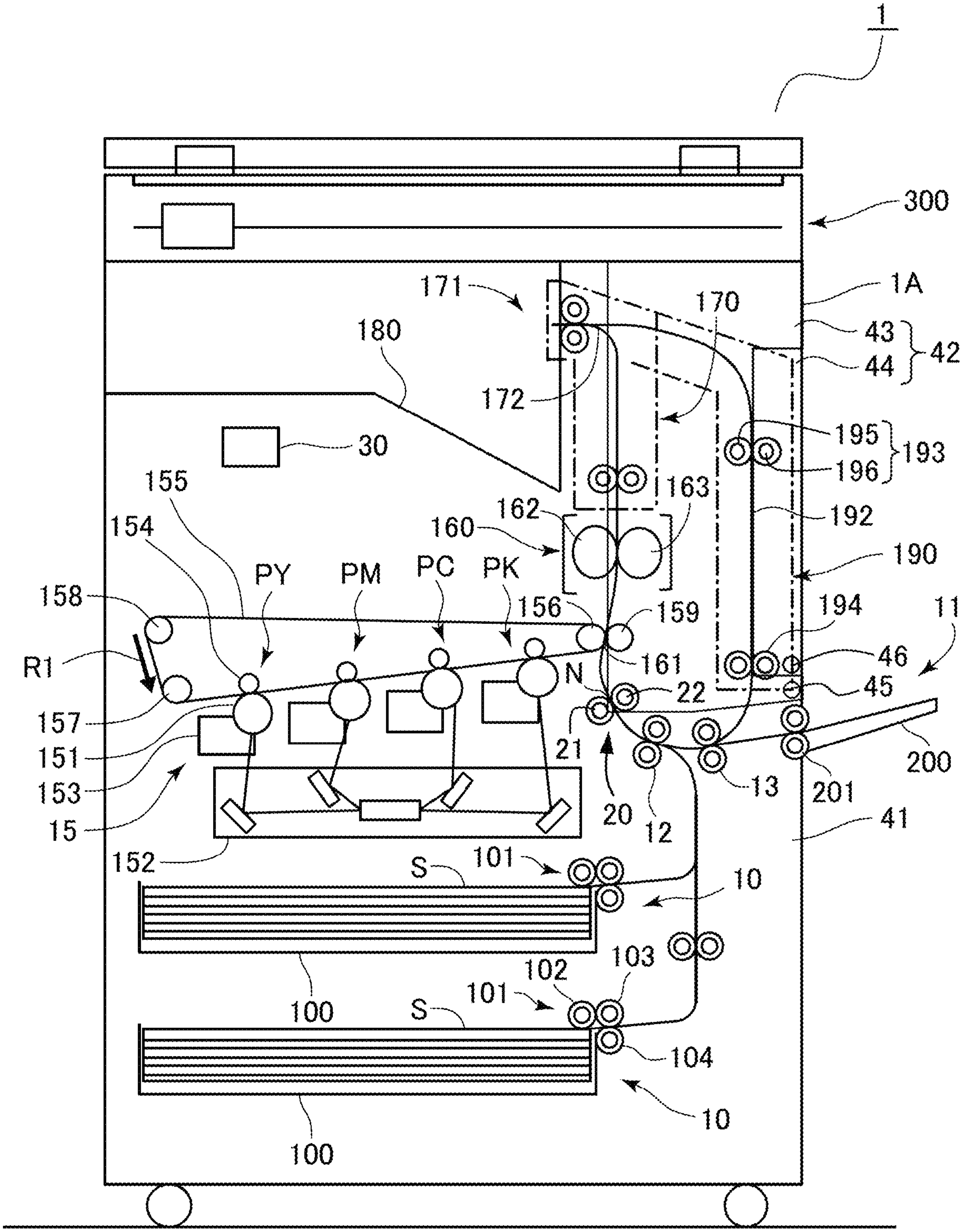
FIG. 1 is a cross-sectional view illustrating an image forming apparatus according to a present embodiment.

FIG. 1 is a schematic view of the image forming apparatus 1 according to the present embodiment. The image forming apparatus 1 forms an image on a sheet serving as a recording medium based on image information entered from an external PC or image information read from a document. The sheet used as the recording medium may be various types of sheet materials formed of different materials and having different sizes, which include paper having different grammages, such as thick paper, plain paper, and thin paper, envelopes, plastic films for overhead projectors, and cloths.

The image forming apparatus 1 includes an apparatus body 1A that accommodates an image forming unit 15 for forming images on sheets S, and an image reading apparatus 300 that is disposed above the apparatus body 1A and that reads image information from documents. The image forming unit 15 is an intermediate transfer-type electrophotographic unit including four image forming stations PY, PM, PC, and PK, an intermediate transfer belt 155, and a fixing unit 160.

Each of the image forming stations PY to PK forms a toner image on a surface of a photosensitive drum 151 serving as an image bearing member by executing an electrophotographic process. That is, when a request to form a toner image is output to the respective image forming stations PY to PK, each photosensitive drum 151 formed of a photosensitive member is driven to rotate, and a charging unit charges the surface of the photosensitive drum 151 uniformly. An exposing unit 152 disposed on a lower portion of the apparatus body 1A irradiates each of the photosensitive drums 151 with laser to expose the surface of the drum light based on an image information, and forms an electrostatic latent image on the photosensitive drum 151. A developing apparatus 153 supplies charged toner particles to the photosensitive drum 151 and develops the electrostatic latent image on the drum surface as a toner image.

In the image forming stations PY to PK, the toner images of respective colors formed on the surface of each of the photosensitive drums 151 are transferred via the intermediate transfer belt 155 and a secondary transfer roller 159 and finally onto the sheet S. At first, toner images borne on each of the photosensitive drums 151 are primarily transferred through the primary transfer rollers 154 onto the intermediate transfer belt 155. Attachments such as toner remaining on the photosensitive drum 151 are removed by a cleaning device disposed on each of the image forming stations PY to PK.

The intermediate transfer belt 155 serving as an intermediate transfer body is wound around a secondary transfer inner roller 156, a tension roller 157, and a stretch roller 158, and is driven to rotate in an R1 direction in the drawing. The toner image borne on the intermediate transfer belt 155 is secondarily transferred to the sheet S at a secondary transfer portion 161 that is formed between the intermediate transfer belt 155 and the secondary transfer roller 159 arranged facing the secondary transfer inner roller 156. Attachments such as toner remaining on the intermediate transfer belt 155 is removed by a belt cleaning device.

The sheet S on which a toner image has been transferred is conveyed to the fixing unit 160. The fixing unit 160 serving as a fixing portion of the present embodiment includes a fixing roller 162 serving as a rotary member for conveying the sheets S, a pressure roller 163 that nips the sheet S with the fixing roller 162, and a heat source such as a halogen lamp not shown for heating the toner image on the sheet. The fixing unit 160 applies heat and pressure to the toner image while conveying the sheet S to melt toner, and by the toner solidifying thereafter, the image is fixed to the sheet S.

In parallel with the image forming process described above, sheets S are fed one by one from a cassette sheet feed portion 10 or a manual sheet feed portion 11 toward the image forming unit 15. The cassette sheet feed portion 10 includes sheet feed cassettes 100 and 100 which are arranged one above the other and storing sheets S in the inner side of the apparatus body 1A, and a sheet feed unit 101 for feeding sheets S from each of the sheet feed cassettes 100. The sheet feed unit 101 includes a pickup roller 102, a feed roller 103, and a separation roller 104. Regarding image formation, when sending sheets S out from the sheet feed cassette 100, in a state where a control unit 30 outputs a print signal, the sheet S stored in the sheet feed cassette 100 is fed by the pickup roller 102. Thereafter, the sheets S are fed one sheet at a time to a conveyance path by a roller pair composed of the feed roller 103 and the separation roller 104, and the sheet S is conveyed via a conveyance roller pair 12 to a registration roller pair 20.

The manual sheet feed portion 11 includes a manual sheet feed tray 200 on which sheets S are supported by a user on the outer side of the apparatus body 1A, and a sheet feed unit 201 for feeding the sheet S from the manual sheet feed tray 200. During image formation, in a state where sheets S are fed from the manual sheet feed tray 200, when a print signal is generated from the control unit 30, the sheet S supported on the manual sheet feed tray 200 is fed by a pickup roller. Thereafter, the sheet S is fed one at a time to a conveyance path by a roller pair composed of a feed roller and a separation roller, and the sheet S is further conveyed via a conveyance roller pair 13 and the conveyance roller pair 12 to the registration roller pair 20.

In a state where the sheet S is abutted against a nip portion of the registration roller pair 20 when the registration roller pair 20 is stopped, the conveyance roller pair 12 pushes the sheet S into the nip portion, by which the sheet S is warped between the conveyance roller pair 12 and the registration roller pair 20. Thereby, the orientation of the sheet S is corrected such that the leading edge of the sheet S is aligned, and when the registration roller pair 20 is rotated in this state, skewing of the sheet S is corrected and the sheet S is conveyed to the secondary transfer portion 161 of the image forming unit 15. The secondary transfer portion 161 is an example of an image forming position where an image is formed on the sheet.

The registration roller pair 20 is an example of a registration roller pair, which includes a driving roller 21 serving as an example of a first roller and a driven roller 22 serving as an example of a second roller, which come into contact with each other to form a nip portion N. The registration roller pair 20 is positioned upstream of the secondary transfer portion 161 in a sheet conveyance direction FD along a vertical direction (refer to FIG. 5), and nips the sheet S at the nip portion N to convey the sheet S to the secondary transfer portion 161. An axial direction of the driving roller 21 is a sheet width direction orthogonal to the sheet conveyance direction FD.

The sheet S on which an image has been formed by passing through the secondary transfer portion 161 and the fixing unit 160 is conveyed by a post-fixing conveyance portion 170 to a sheet discharge roller 171. The sheet discharge roller 171 discharges the sheet S on which an image has been formed, and places the sheet S on a sheet discharge tray 180 disposed at an upper portion of the apparatus body 1A. The present embodiment adopts a so-called internal discharge-type configuration equipped with a sheet discharge space, i.e., an upper space of the sheet discharge tray 180, in which the sheet S is supported between the apparatus body 1A and the image reading apparatus 300 in the vertical direction.

The sheet discharge roller 171 is an example of a reverse portion for performing reverse conveyance of the sheet S on which an image has been transferred to a first surface at the image forming unit 15 for allowing an image to be transferred to a second surface opposite to the first surface. That is, in duplex printing, the sheet discharge roller 171 conveys the sheet S on which an image has been formed on the first surface, and when a trailing edge of the sheet S passes through a branch portion 172, the conveyance direction is reversed to switch the conveyance direction of the sheet S. Thereby, the sheet S is sent to a duplex conveyance portion 190, and by reconveyance roller pairs 193 and 194 of the duplex conveyance portion 190, the sheet S is conveyed via a duplex path 192, serving as an example of a reconveyance path, toward the registration roller pair 20. That is, the reconveyance roller pairs 193 and 194 convey the sheet S that has been conveyed from the secondary transfer portion 161 through the duplex path 192 for conveying the sheet S again to the registration roller pair 20. In the present embodiment, the reconveyance roller pair 193 includes a driving roller 195 which is an example of a third roller, and a driven roller 196 which is an example of a fourth roller, which are in contact with each other and form a nip portion. After being subjected to skew correction again by the registration roller pair 20, the sheet S on which an image has been formed on the second surface by passing through the secondary transfer portion 161 and the fixing unit 160 is discharged by the sheet discharge roller 171 to be supported on the sheet discharge tray 180.

In the above description, the image forming unit 15 may be an image forming unit of a direct transfer-type electrophotographic unit, an inkjet system, or an offset printing system.

Opening and Closing Mechanism of Apparatus Body

Figure 2:
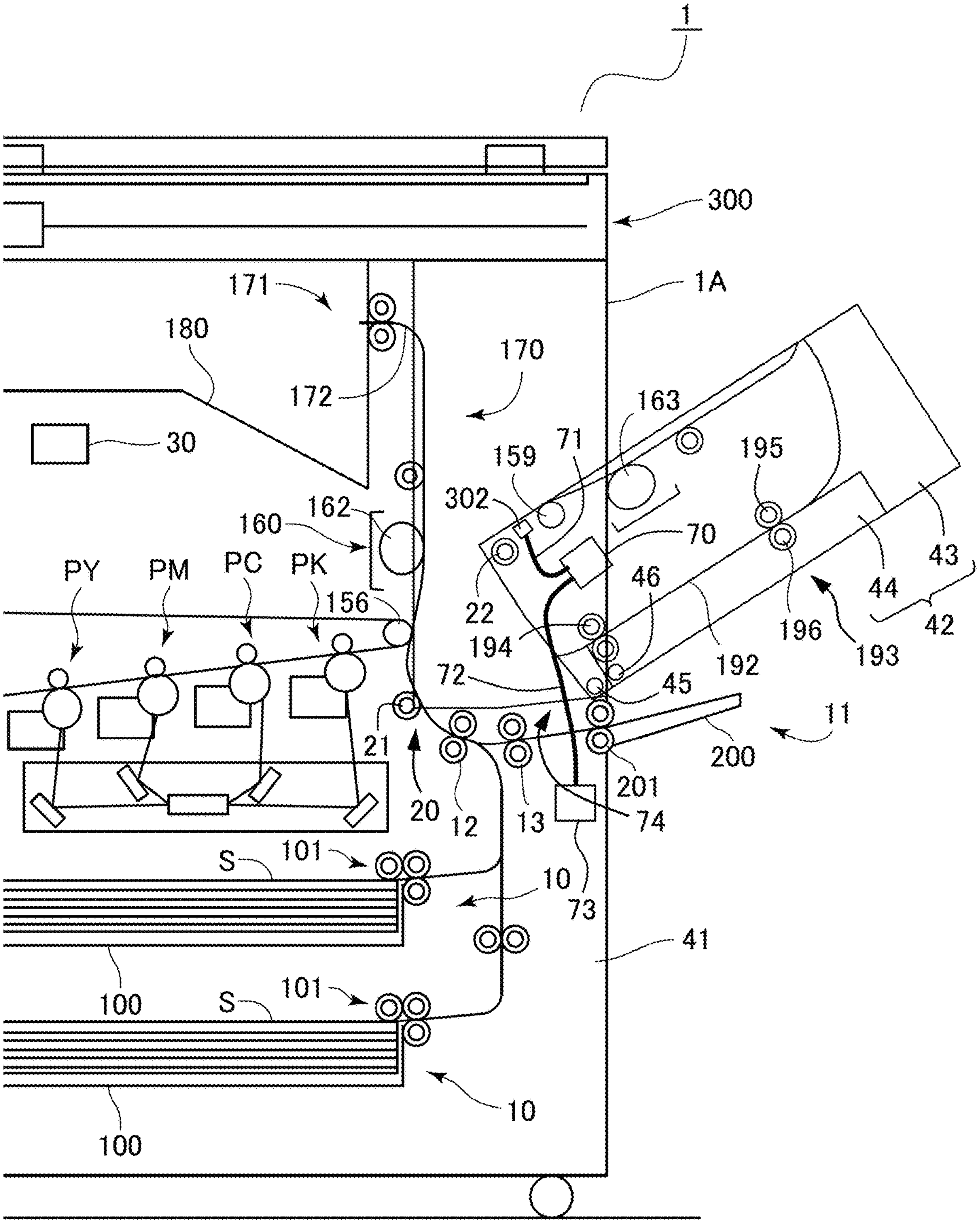
FIG. 2 is a cross-sectional view illustrating a state in which a right door unit of the image forming apparatus according to the present embodiment is opened.

Next, an opening and closing mechanism on a right side portion of the apparatus body 1A, that is, a side portion on which the manual sheet feed portion 11 is disposed, will be described. As illustrated in FIG. 2, the apparatus body 1A includes a casing 41, and a right door unit 42, which is an example of an opening and closing unit which opens and closes by pivoting on the right side portion with respect to the casing 41. The right door unit 42 opens and closes by pivoting in a right-left direction with respect to the casing 41 about a pivot shaft 45 arranged in the axial direction of the driving roller 21, which corresponds to the sheet width direction. The pivot shaft 45 is arranged, for example, in the area directly above a sheet feed unit 201 of the manual sheet feed tray 200. The driven roller 22, the secondary transfer roller 159, the pressure roller 163, and the reconveyance roller pairs 193 and 194 are accommodated in the right door unit 42. Further, the driving roller 21, the secondary transfer inner roller 156, and the fixing roller 162 are accommodated in the casing 41. The present embodiment has been illustrated based on a case where the driven roller 22 is disposed on the right door unit 42 and the driving roller 21 is disposed in the casing 41, but the present technique is not limited thereto, and the arrangement may be opposite.

Figure 3:
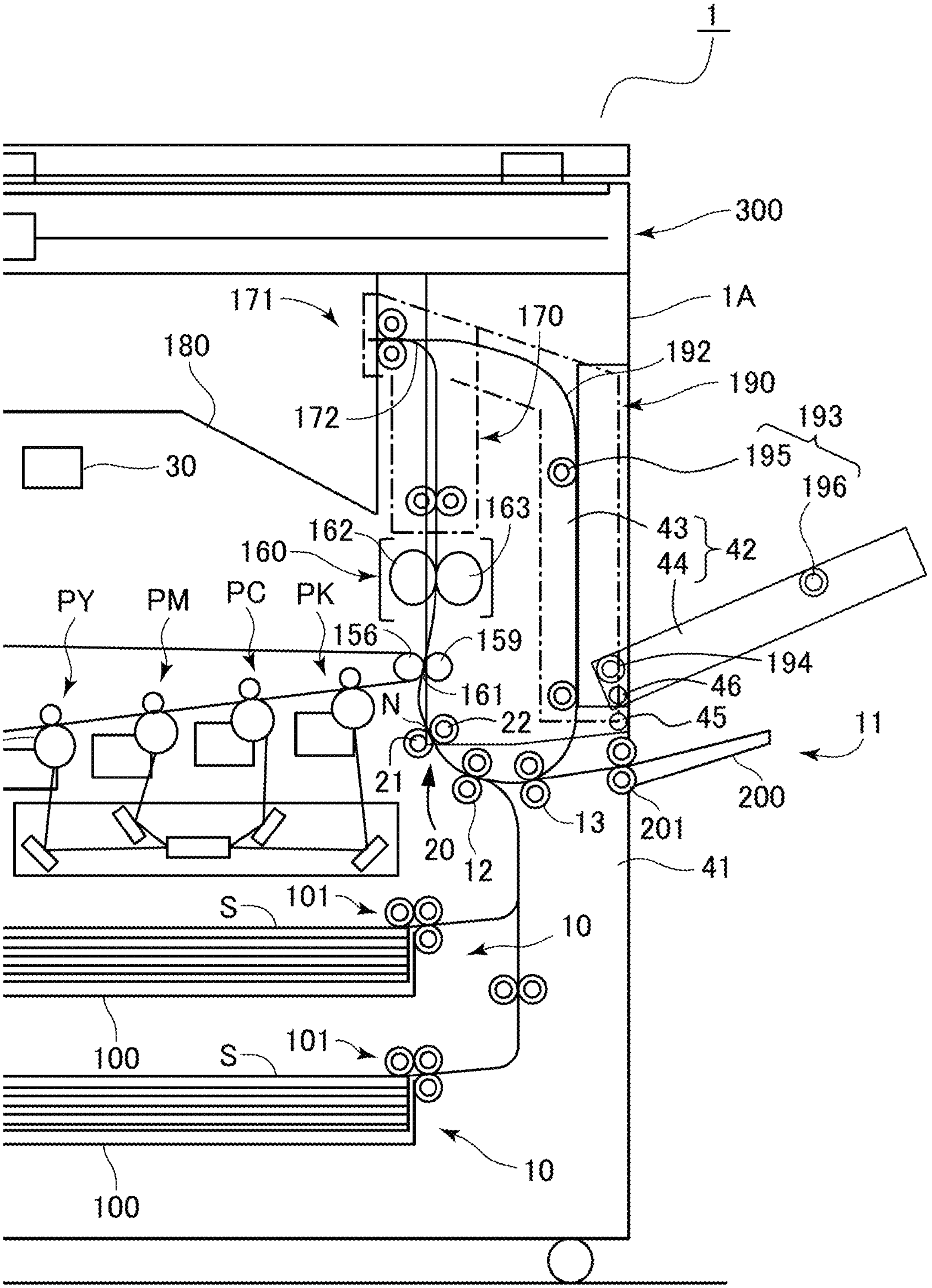
FIG. 3 is a cross-sectional view illustrating a state in which a cover portion of the image forming apparatus according to the present embodiment is opened.

As illustrated in FIG. 3, the right door unit 42 includes a body portion 43, and a cover portion 44 that is disposed to open and close with respect to the body portion 43. In the present embodiment, the cover portion 44 is enabled to open and close by pivoting in the right-left direction about a pivot shaft 46 disposed on a lower side with respect to the body portion 43. The driving roller 195 of the reconveyance roller pair 193 is accommodated in the body portion 43, and the driven roller 196 of the reconveyance roller pair 193 is disposed on the cover portion 44.

Control System

Figure 4:
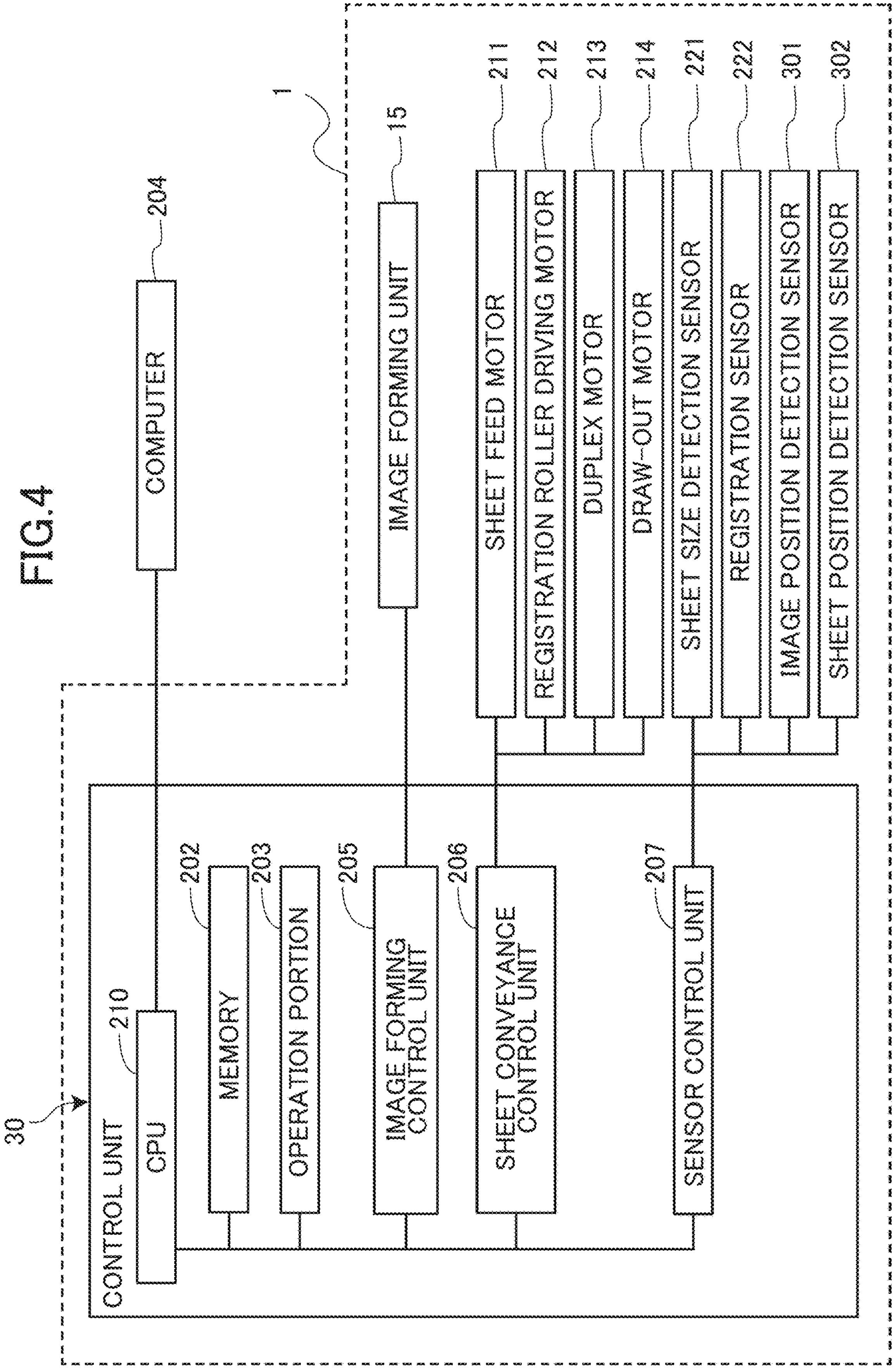
FIG. 4 is a block diagram illustrating a control system of the image forming apparatus according to the present embodiment.

Now, a control unit for controlling a functional configuration included in the image forming apparatus 1 will be described. FIG. 4 is a block diagram for illustrating a control system of the image forming apparatus 1. The control unit 30 includes various function units including a Central Processing Unit (CPU) 210, a memory 202, an operation portion 203, an image forming control unit 205, a sheet conveyance control unit 206, and a sensor control unit 207. Further, for example, the control unit 30 may be designed to receive various information related to the sheet S used for printing from a computer 204 connected via a network.

The CPU 210 realizes various processing performed by the image forming apparatus 1 through execution of a predetermined control program. The memory 202 may be a Random Access Memory (RAM) or a Read Only Memory (ROM), storing various programs and various data in predetermined storage areas. The operation portion 203 receives various operations performed by the user, such as various information related to the sheet S that the user uses for printing, such as size information, grammage information, and surface property information, and various instructions entered by the user such as to execute printing or discontinue printing.

The image forming control unit 205 outputs instructions to the image forming unit 15 including the exposing unit 152, and controls the image forming operation. The sheet conveyance control unit 206 outputs instructions to a sheet feed motor 211, a registration roller driving motor 212, a duplex motor 213, and a draw-out motor 214, and controls the conveyance of the sheet S. The sheet feed motor 211 drives the sheet feed unit 101. The registration roller driving motor 212 drives the registration roller pair 20. The duplex motor 213 drives the reconveyance roller pairs 193 and 194.

The sensor control unit 207 controls starting or stopping of detection of a sheet size detection sensor 221, a registration sensor 222, an image position detection sensor 301, and a sheet position detection sensor 302, and receives detection results from the respective sensors. The sheet size detection sensor 221 and the registration sensor 222 are arranged upstream of the registration roller pair 20 in the sheet conveyance direction FD.

Configuration from Registration Roller Pair to Secondary Transfer Portion

Figure 5:
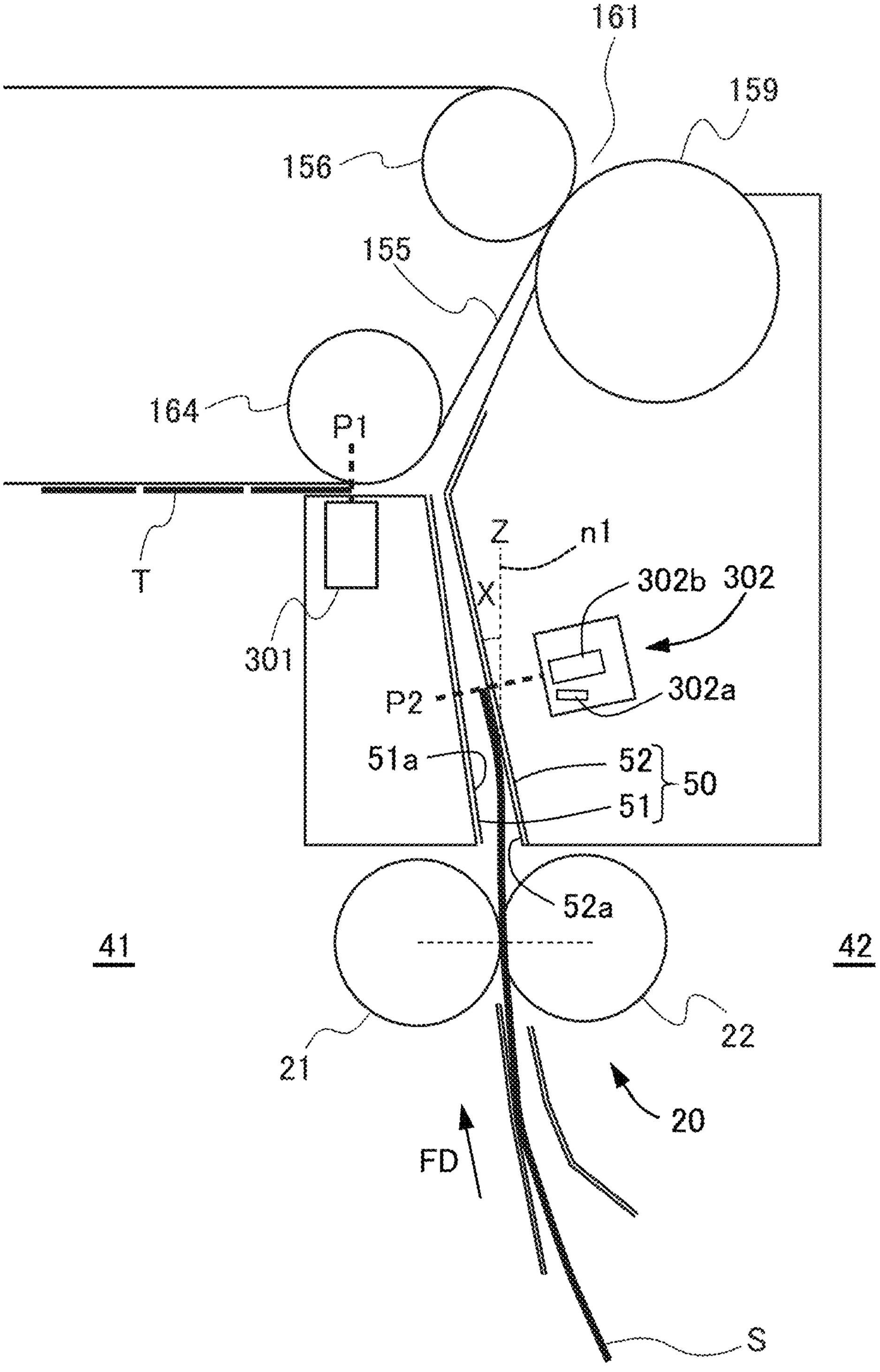
FIG. 5 is a cross-sectional view illustrating an area from a registration roller pair to a secondary transfer portion according to the present embodiment.

Now, a basic configuration of components from the registration roller pair 20 to the secondary transfer portion 161 will be described. FIG. 5 is a cross-sectional view of a configuration from the registration roller pair 20 to the secondary transfer portion 161 of the image forming apparatus 1 viewed from a front side. As illustrated in FIG. 5, the sheet position detection sensor 302 is arranged downstream of the registration roller pair 20 in the sheet conveyance direction FD and upstream of the secondary transfer portion 161 in the sheet conveyance direction FD. The sheet position detection sensor 302 is composed of an optical sensor including a light emitting unit 302*a* such as an LED that emits light, and a light receiving unit 302*b* that receives light that has been emitted from the light emitting unit 302*a* and reflected on the sheet S. The sheet position detection sensor 302 is not limited to the above-described optical sensor.

The sheet position detection sensor 302 detects that the sheet S has passed a detection position P2. That is, the sheet position detection sensor 302 is an example of a detection unit, and it is disposed on the right door unit 42 at a position between the registration roller pair 20 and the secondary transfer portion 161 in the sheet conveyance direction FD. Then, the sheet position detection sensor 302 detects the leading edge of the sheet S conveyed from the registration roller pair 20 toward the secondary transfer portion 161.

As illustrated in FIG. 2, the right door unit 42 includes a first board 70 that is electrically connected to the sheet position detection sensor 302 through a first cable 71. The casing 41 includes a second board 73 that is electrically connected to the first board 70 through a second cable 72 formed of a bundle wire. The second board 73 is connected to the control unit 30. The second cable 72 is disposed to pass through a routing space 74 disposed near the pivot shaft 45. In this embodiment, the routing space 74 is an area within a few centimeters of the pivot shaft 45. Thus, the second cable 72 that connects the right door unit 42 and the casing 41 which relatively move with respect to each other may be laid without being pulled or nipped.

As illustrated in FIG. 5, a conveyance guide 50 is disposed between the registration roller pair 20 and the secondary transfer portion 161. The conveyance guide 50 is one example of a guide unit, and it forms a sheet conveyance path that guides the sheet S from the registration roller pair 20 to the secondary transfer portion 161. The conveyance guide 50 includes a first guide member 51 disposed in the casing 41, and a second guide member 52 that is disposed in the right door unit 42 and facing the first guide member 51. The first guide member 51 includes a first guide surface 51*a*, which is an example of a first surface that guides the sheet S. The second guide member 52 includes a second guide surface 52*a*, which is an example of a second surface that guides the sheet S. The second guide member 52 forms a sheet conveyance path together with the first guide member 51.

In the present embodiment, the second guide surface 52*a* is an example of a guide surface, which is arranged in a manner inclined toward a side of the registration roller pair 20 from a direction parallel to a straight line connecting centers of the driving roller 21 and the driven roller 22 when viewed in the sheet width direction, the line being illustrated by a dashed line in FIG. 5. A nip line n1 of the registration roller pair 20 is a line that is orthogonal to a straight line connecting the center lines of the driving roller 21 and the driven roller 22 and that is tangential to the driving roller 21 and the driven roller 22. The conveyance guide 50 and the registration roller pair 20 are arranged to be in a positional relationship, when viewed in the sheet width direction, in which a nip line 50*n* intersects the second guide surface 52*a* of the conveyance guide 50 at a position upstream of the detection position P2 in the sheet conveyance direction FD. In the present embodiment, the second guide surface 52*a* of the conveyance guide 50 is arranged such that an angle intersecting a registration roller nip direction Z is set to an angle X, and position of the sheet position detection sensor 302 is determined with respect to the conveyance guide 50.

The intersecting position between the nip line n1 and the second guide surface 52*a* should be arranged upstream of the detection position P2 in the sheet conveyance direction FD, and as described below, this configuration is adopted to enhance a detection accuracy of the sheet S conveyed from the registration roller pair 20. Therefore, it is preferable that the intersecting position between the nip line n1 and the second guide surface 52*a* is not too far and not too close from the detection position P2, such that the leading edge of the sheet S conveyed from the registration roller pair 20 is positioned to be in contact with the second guide surface 52*a* at the detection position P2. The distance between the intersecting position where the nip line n1 intersects the second guide surface 52*a* and the detection position P2 is preferably approximately 5 mm or more and 15 mm or less, though it may differ according to other conditions such as the grammage of the sheet S, the conveyance speed, and the magnitude of angle X.

Meanwhile, the conveyance guide 50 and the registration roller pair 20 are arranged such that, when viewed in the sheet width direction, the nip line n1 of the registration roller pair 20 does not intersect the first guide surface 51*a*. Thereby, the leading edge of the sheet S conveyed from the registration roller pair 20 toward the conveyance guide 50 may enter the space constituting the conveyance path of the conveyance guide 50. In the present embodiment, the registration roller pair 20 is arranged below the secondary transfer portion 161, and the sheet S is conveyed upward in the vertical direction. However, the present technique is not limited thereto, and the registration roller pair 20 may be disposed above the secondary transfer portion 161 and the sheet S may be conveyed downward in the vertical direction. Further, according to the present embodiment, the first guide surface 51*a* and the second guide surface 52*a* are each an approximately flat surface, but the present technique is not limited thereto, and they may be curved surfaces.

Detection and Adjustment of Leading Edge Position of Image on Intermediate Transfer Belt Next, an adjustment of leading edge position of image on the intermediate transfer belt 155 will be described. In the image forming apparatus 1, when adjustment of image position is started, a toner patch pattern T is formed on the intermediate transfer belt 155, and a leading edge position of image of the toner patch pattern T in a sub-scanning direction is detected by the image position detection sensor 301 and stored in the sensor control unit 207. An adjustment value is entered from the operation portion 203, and the image forming timing and the image forming position are set, wherein if the entered adjustment value is equal to a fixed value or less, the adjustment of image position is ended. In the present embodiment, regarding a direction of rotation of the intermediate transfer belt 155, the image position detection sensor 301 is arranged at an upstream portion immediately before the secondary transfer portion 161. Thereby, compared to the adjustment of image position at a timing when the toner patch pattern T is formed on the intermediate transfer belt 155, a highly accurate adjustment of image position is enabled, taking into consideration the influence of deflection of the intermediate transfer belt 155 from the image forming position to the secondary transfer portion 161.

Leading Edge Registration Control

Figure 6:
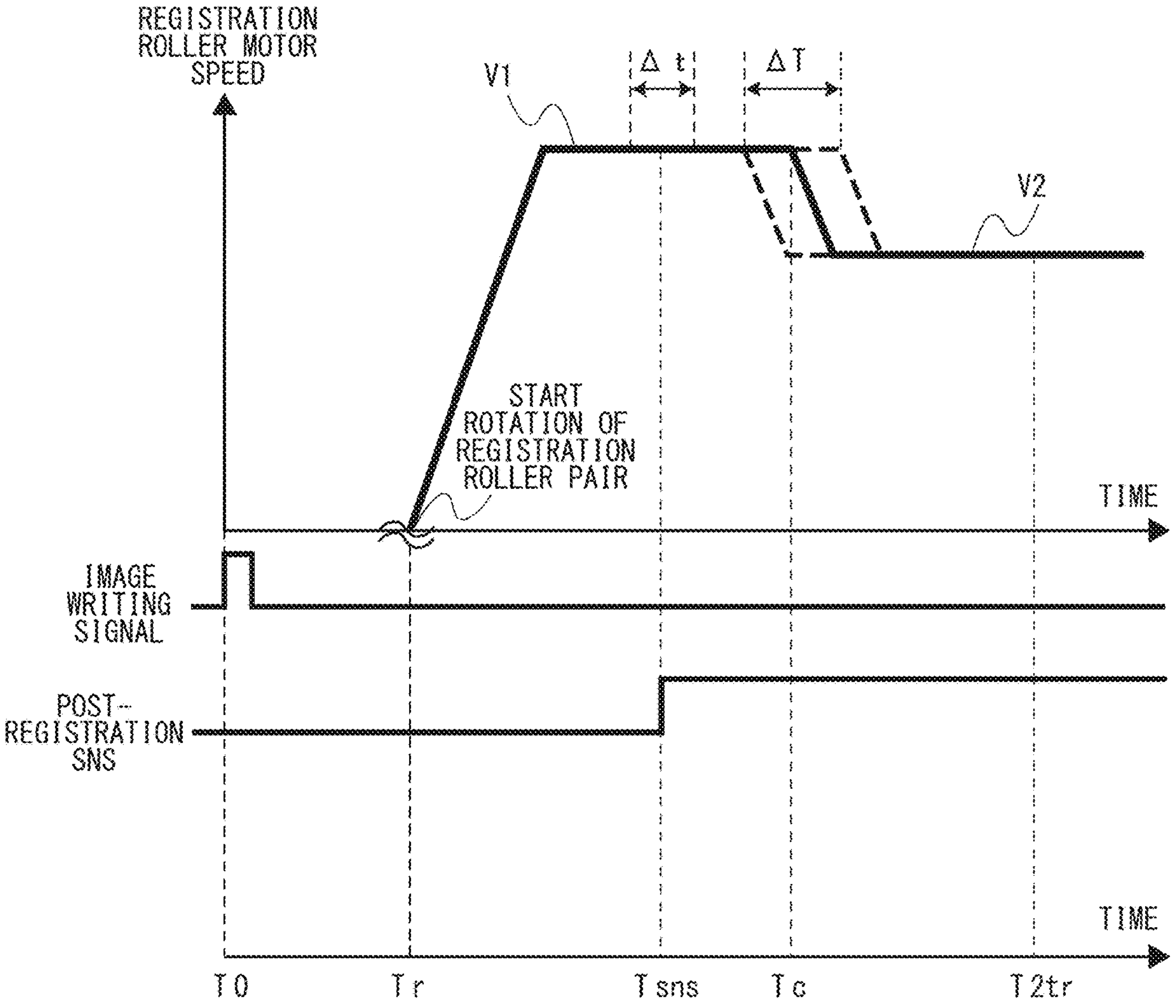
FIG. 6 is a graph illustrating a sheet conveyance speed in an image forming apparatus according to the present embodiment.

Next, a leading edge registration control for highly accurately controlling a leading edge margin of image will be described. FIG. 6 is a graph illustrating a state of sheet conveyance control of the registration roller pair 20 regarding leading edge registration control, wherein a horizontal axis indicates time and a vertical axis indicates a registration roller conveyance speed. TO denotes a time at which the control unit 30 has received an image writing signal. The control unit 30 starts rotation of the registration roller pair 20 by computing a timing of reaching the sheet S at the secondary transfer portion 161 to correspond to a timing T2*tr* at which a leading edge of the image reaches the secondary transfer portion 161 (Tr: start rotation of registration roller pair). After starting rotation of the registration roller pair 20, the sheet S is conveyed at a conveyance speed V1 and passes the sheet position detection sensor 302 (post-registration SNS).

In this state, a time Tsns at which the sheet passes the sheet position detection sensor 302 is dispersed. The cause of dispersion of passing time of the sheet position detection sensor 302 is mainly caused by the dispersion of stop position of the sheet S at the registration roller pair 20 and the dispersion of conveyance speed after starting rotation of registration roller pair. Further, the dispersion may be caused by the thickness and grammage of the sheet S, the surface property thereof, the variation of diameter and friction coefficient by friction due to successive conveyance performed by the registration roller pair 20, pressure of the registration roller pair 20, and amount of loop of the sheet being abutted against the registration roller pair 20. Further, the dispersion may be caused by the position at which the sheet stops at the registration roller pair 20 that depends on the sheet feed cassette 100, the stopping time, and the drive property of motor. The dispersion of detection of the sheet position detection sensor 302, which is one of the causes of dispersion, is denoted as Δt.

The leading edge registration control detects the time Tsns at which time each sheet passes the sheet position detection sensor 302. Then, a timing at which the conveyance speed is to be changed from the conveyance speed V1 at which the sheet S passes the sheet position detection sensor 302 to a conveyance speed V2 after the sheet S had passed through the sheet position detection sensor 302 is computed, and change of speed is executed. Thereby, the timing at which the sheet S reaches the secondary transfer portion 161 may be stabilized, and the length of margin of the leading edge of the image on the sheet may be stabilized.

Leading Edge Registration Control and Sheet Conveyance Position

Now, a configuration for enhancing a detection accuracy of the sheet position detection sensor 302 in a conveyance cross-section of a vertical path system according to the present embodiment will be described. The detection accuracy of sheet position detection sensor 302 illustrated in FIG. 5 depends on the distance between the sheet S serving as a sensor detection target and the sheet position detection sensor 302, such that if the distance thereof is dispersed, there is a drawback that the detection accuracy of the sheet position detection sensor 302 becomes unstable. In the present embodiment, an optical sensor is used as the sheet position detection sensor 302, wherein the optical sensor has a characteristics that the detection accuracy becomes higher as the distance between the measurement object and the sensor becomes shorter.

Figure 7:
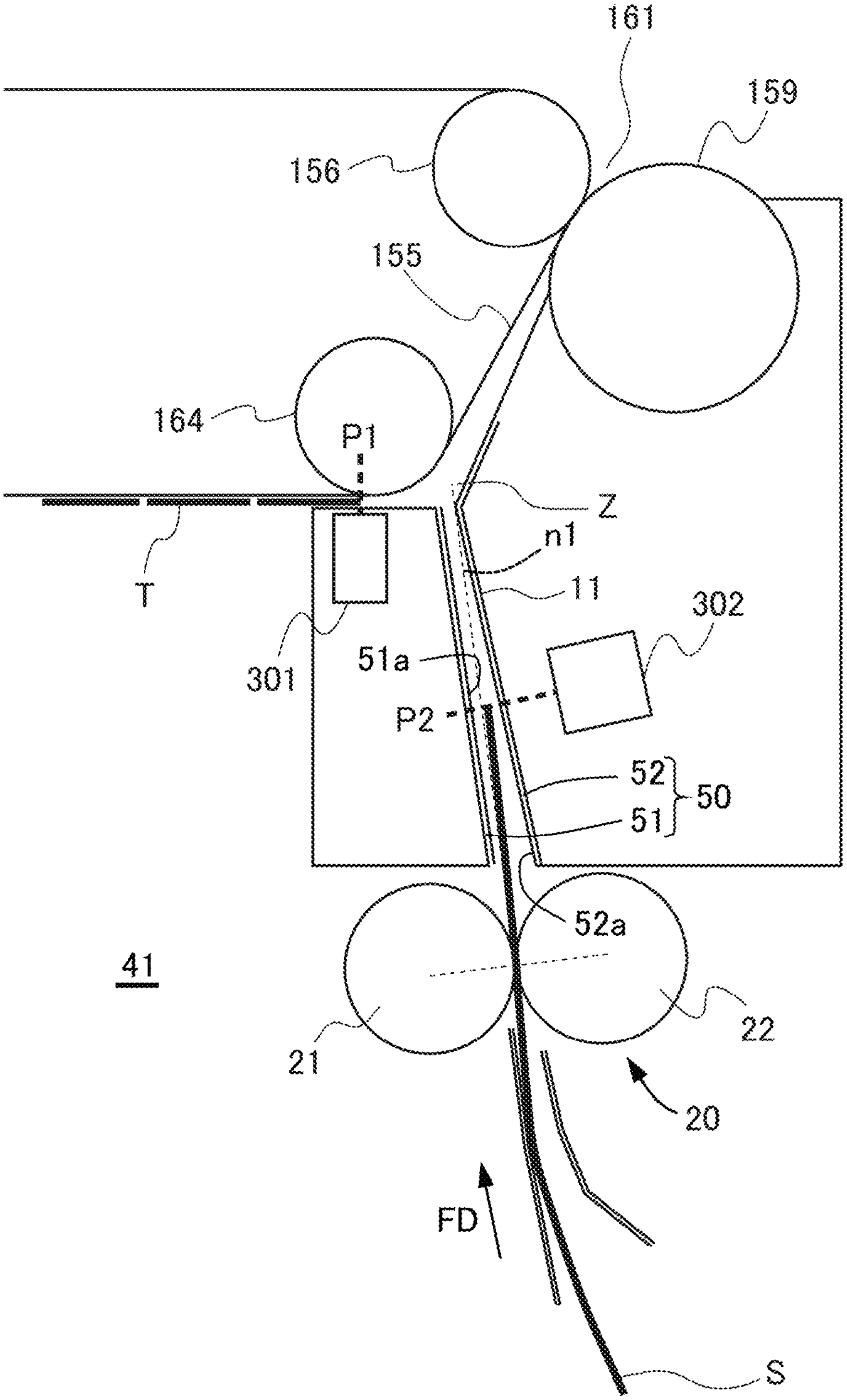
FIG. 7 is a cross-sectional view illustrating an area from a registration roller pair to a secondary transfer portion according to a comparative example.
Figure 8:
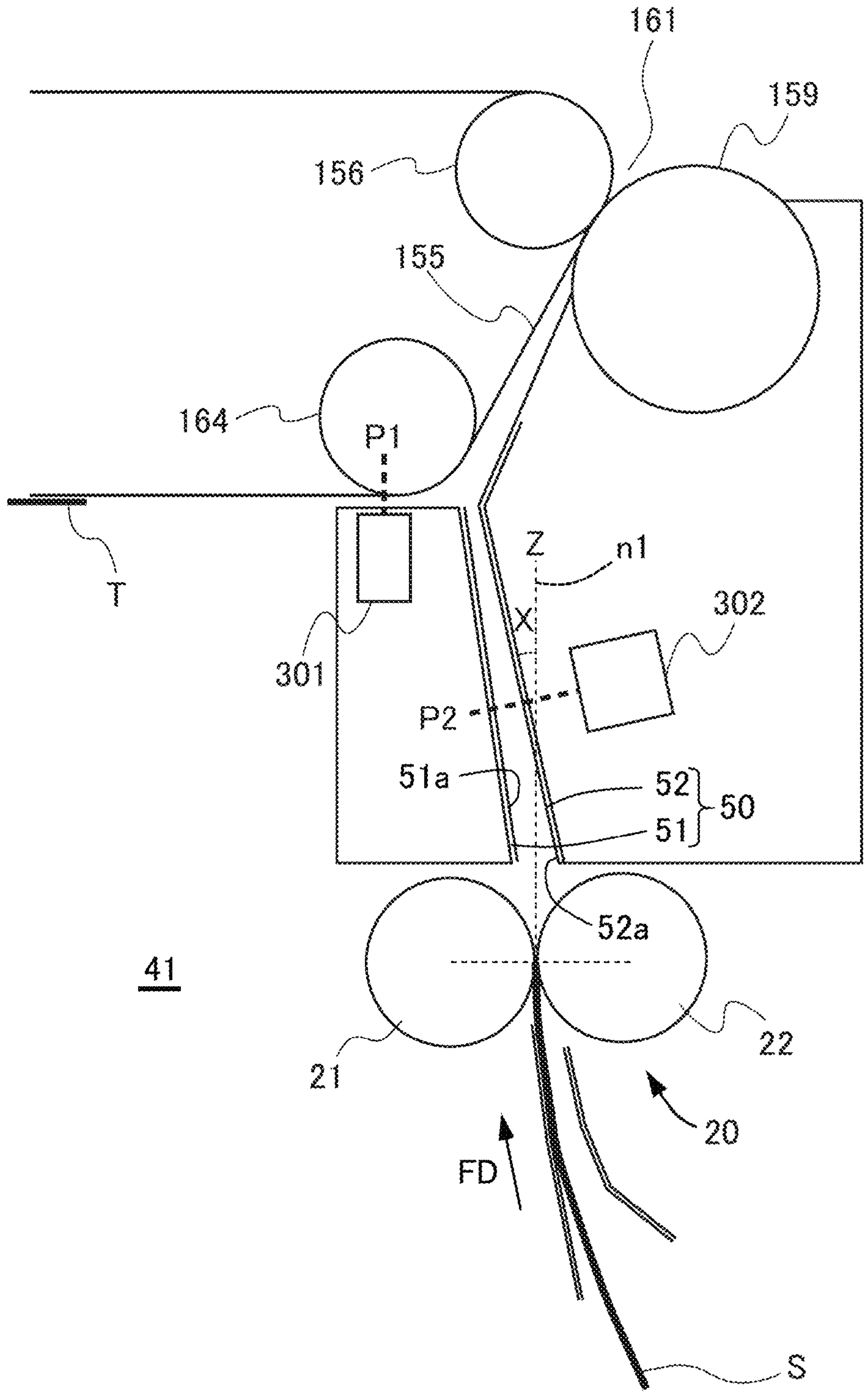
FIG. 8 is a cross-sectional view illustrating a state in which a sheet is stopped at the registration roller pair in the configuration from the registration roller pair to the secondary transfer portion according to the present embodiment.

Now, the present embodiment will be described with respect to a time series of leading edge registration control. FIGS. 7 and 8 are cross-sectional views illustrating the configuration from the registration roller pair 20 to the secondary transfer portion 161 of the image forming apparatus 1 from a front side. FIG. 7 is a cross-sectional view illustrating the configuration from the registration roller pair 20 to the secondary transfer portion 161 according to the comparative example viewed from the front side, and FIG. 8 is a cross-sectional view illustrating the configuration according to the present embodiment in a state where the sheet S is stopped at the registration roller pair 20 viewed from the front side at time Tr immediately prior to the starting of rotation of the registration roller pair.

According to the comparative example illustrated in FIG. 7, after the rotation of the registration roller pair is started and when the sheet S is conveyed upward against gravity, the leading edge of the sheet flutters within a guide gap, and detection dispersion Δt of the sheet position detection sensor 302 occurs. In contrast, according to the present embodiment, as illustrated in FIG. 8, the second guide member 52 of the conveyance guide 50 supporting the sheet position detection sensor 302 is disposed at an angle X intersecting the nip line n1. Therefore, the sheet S is conveyed along the second guide surface 52*a* from an upstream side of the detection position P2 of the sheet position detection sensor 302.

Figure 9:
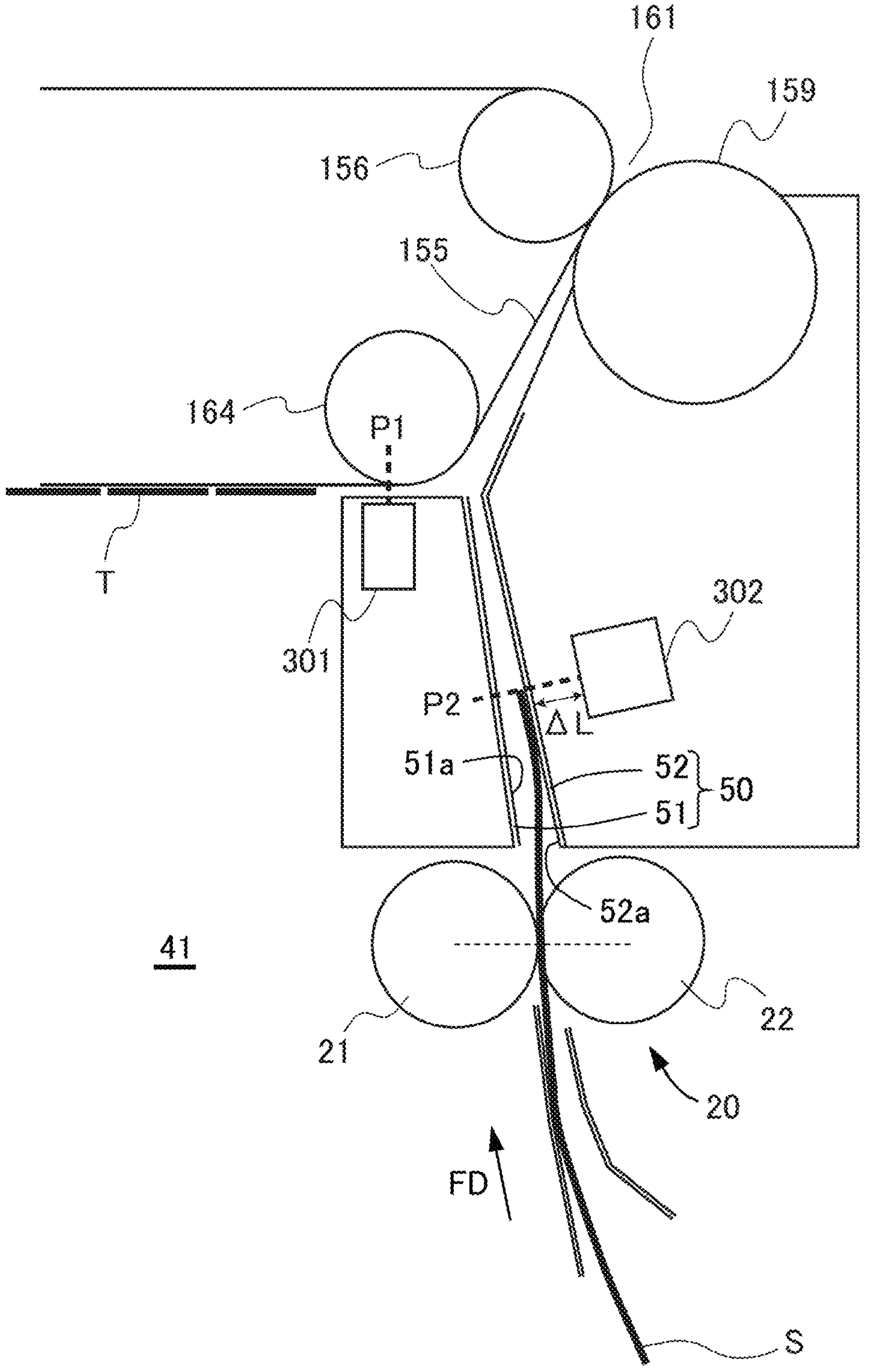
FIG. 9 is a cross-sectional view illustrating a state in which the leading edge of a sheet at a registration roller pair is detected by a sheet position detection sensor in the configuration from the registration roller pair to the secondary transfer portion according to the present embodiment.

At time Tsns when the leading edge of the sheet reaches the sheet position detection sensor 302, as illustrated in FIG. 9, a distance between the sheet and the sheet position detection sensor 302 is maintained at a fixed distance=ΔL. In this state, by maintaining the distance between the sheet S and the sheet position detection sensor 302 to a fixed distance (=ΔL), the dispersion of detection of the sheet position detection sensor 302 becomes small and is stabilized. That is, according to the detection result of the sheet position detection sensor 302, compared to the configuration of the comparative example, the leading edge registration control has a smaller dispersion ΔT of timing for reducing the speed from the conveyance speed V1 when the sheet is passed through the position detection sensor to the conveyance speed V2 after the sheet had passed through the sheet position detection sensor. Therefore, the accuracy of the leading edge registration control is improved, and the accuracy of registration may be improved.

As described above, according to the image forming apparatus 1 of the present embodiment, the conveyance guide 50 and the registration roller pair 20 are in a positional relationship in which the nip line 50*n* intersects the second guide surface 52*a* of the conveyance guide 50 at a position upstream of the detection position P2 in the sheet conveyance direction FD. Thereby, even when the sheet S is conveyed upward or downward in the vertical direction, the sheet S may be conveyed along the second guide surface 52*a*, such that the distance between the sheet position detection sensor 302 and the leading edge of the sheet is stabilized. Therefore, it becomes possible to suppress the leading edge of the sheet S from fluttering and cause deterioration of detection accuracy of the sheet position detection sensor 302, and to improve the detection accuracy.

Further, according to the present embodiment described above, the leading edge of the sheet S conveyed from the registration roller pair 20 comes into contact with the second guide surface 52*a*. Since the sheet position detection sensor 302 is disposed on a rear side of the second guide surface 52*a*, the distance between the sheet S and the sensor may be minimized. Therefore, the detection accuracy by the sheet position detection sensor 302 may be improved further.

According to the present invention, the dispersion of distance between the sheet position sensor disposed between the registration roller pair and the image forming position and the leading edge of the sheet conveyed from the registration roller may be suppressed.

Other Embodiments

According to the present embodiment described above, the leading edge of the sheet S conveyed from the registration roller pair 20 is made to come into contact with the second guide surface 52*a*, but the present technique is not limited thereto. For example, it may come into contact with and be conveyed along the first guide surface 51*a*. Even according to this case, the fluttering of the leading edge of the sheet S may be suppressed, and the detection accuracy of the sheet position detection sensor 302 may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-102541, filed Jun. 22, 2023 which is hereby incorporated by reference herein in its entirety.

What is claimed is:

1. An image forming apparatus comprising:

a casing;

a door configured to open and close by pivoting with respect to the casing;

an image forming unit accommodated in the casing and configured to form an image on a sheet, the image being formed on the sheet at an image forming position;

a registration roller pair positioned upstream of the image forming position in a sheet conveyance direction along a vertical direction, including a first roller and a second roller configured to come into contact with each other to form a nip portion, and configured to nip the sheet at the nip portion to convey the sheet to the image forming position;

a sensor disposed on the door to be positioned between the registration roller pair and the image forming position in the sheet conveyance direction, and configured to detect a leading edge of the sheet conveyed from the registration roller pair toward the image forming position; and a guide unit configured to form a sheet conveyance path that is configured to guide the sheet from the registration roller pair to the image forming position, the guide unit including:

a first guide member disposed in the casing and including a first surface configured to guide the sheet; and a second guide member disposed in the door and facing the first guide member, the second guide member including a second surface configured to guide the sheet and configured to form the sheet conveyance path together with the first guide member, wherein the guide unit and the registration roller pair are arranged such that a nip line of the registration roller pair, which is orthogonal to a straight line connecting a center of the first roller and a center of the second roller, intersects the second surface of the second guide member at a position between a detection position of the sensor and the nip portion of the registration roller pair in the sheet conveyance direction as viewed in an axial direction of the first roller.

2. The image forming apparatus according to claim 1, wherein the guide unit and the registration roller pair are arranged such that the nip line of the registration roller pair does not intersect the first surface between the detection position of the sensor and the nip portion of the registration roller pair in the sheet conveyance direction as viewed in the axial direction.

3. The image forming apparatus according to claim 1, wherein the registration roller pair is arranged below the image forming position in the vertical direction.

4. The image forming apparatus according to claim 1, wherein:

the first roller is disposed in the casing, and the second roller is disposed in the door.

5. The image forming apparatus according to claim 1, wherein the door is configured to open and close by pivoting with respect to the casing about a pivot shaft arranged in the axial direction.

6. The image forming apparatus according to claim 5, wherein the pivot shaft is disposed at a lower portion of the door.

7. The image forming apparatus according to claim 5, wherein:

the door includes a first board connected electrically to the sensor through a first cable, the casing includes a second board connected electrically to the first board through a second cable, and the second cable is disposed to pass through a routing space disposed near the pivot shaft.

8. The image forming apparatus according to claim 1, wherein a distance between an intersecting position where the nip line intersects the second surface and the detection position is 5 mm or more and 15 mm or less.

9. The image forming apparatus according to claim 1, wherein the second surface is a flat surface.

10. The image forming apparatus according to claim 1, further comprising:

a reconveyance roller pair configured to convey the sheet in a reconveyance path configured to convey the sheet that has been conveyed from the image forming position again to the registration roller pair, wherein the reconveyance roller pair includes a third roller and a fourth roller configured to come into contact with each other and form a nip portion, and wherein the door includes a body portion in which the third roller is disposed, and a cover portion in which the fourth roller is disposed and configured to open and close with respect to the body portion.

11. The image forming apparatus according to claim 1, wherein the sensor is an optical sensor including:

a light emitting unit configured to emit light; and a light receiving unit configured to receive light that has been emitted from the light emitting unit and reflected on the sheet.

12. The image forming apparatus according to claim 1, wherein the position at which the nip line of the registration roller pair intersects the second surface of the second guide member is downstream of the nip portion in the sheet conveyance direction.

13. The image forming apparatus according to claim 1, further comprising a controller configured to change a conveyance speed of the sheet by the registration roller pair based on a detection timing at which the sensor detects the leading edge of the sheet.

* * * * *